(12) United States Patent
Kurz (10) Patent No.: US 11,527,767 B2
(45) Date of Patent: Dec. 13, 2022

(54) GAS-LIQUID SEPARATOR FOR SEPARATING AT LEAST ONE LIQUID COMPONENT FROM A GASEOUS COMPONENT

(71) Applicant: Robert Bosch GmbH, Stuttgart (DE)

(72) Inventor: Michael Kurz, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 16/766,780

(22) PCT Filed: Oct. 24, 2018

(86) PCT No.: PCT/EP2018/079075
§ 371 (c)(1),
(2) Date: May 26, 2020

(87) PCT Pub. No.: WO2019/105656
PCT Pub. Date: Jun. 6, 2019

(65) Prior Publication Data
US 2020/0373592 A1 Nov. 26, 2020

(30) Foreign Application Priority Data
Nov. 28, 2017 (DE) ...................... 10 2017 221 302.7

(51) Int. Cl.
*H01M 8/04119* (2016.01)
*B01D 45/06* (2006.01)
(Continued)

(52) U.S. Cl.
CPC ........ *H01M 8/04164* (2013.01); *B01D 45/06* (2013.01); *B01D 45/16* (2013.01);
(Continued)

(58) Field of Classification Search
None
See application file for complete search history.

(56) References Cited

U.S. PATENT DOCUMENTS 6,579,637 B1 * 6/2003 Savage ............. H01M 8/04156
429/414
2003/0170514 A1 * 9/2003 Faye ....................... B01D 53/24
429/444
(Continued)

FOREIGN PATENT DOCUMENTS

DE 358394 A 9/1922
DE 2243730 A1 4/1974
(Continued)

OTHER PUBLICATIONS

International Search Report for Application No. PCT/EP2018/079075 dated Feb. 1, 2019 (English Translation, 2 pages).

*Primary Examiner* — Jason M Greene
(74) *Attorney, Agent, or Firm* — Michael Best & Friedrich LLP (57) ABSTRACT

The invention relates to a gas-liquid separator (2) for separating at least one liquid component, in particular $H_2O$, from a gaseous component, in particular $H_2$, the separator comprising at least one container (6) which is supplied with a medium via an inlet (16), at least the liquid component of the medium being separated in at least one container (6) and the separated component of the medium being discharged from the at least one container (6) via a discharge valve (46) with the remaining gaseous component of the medium, in particular $H_2$, being recirculated into an outflow line (5) via a first outlet (18). According to the invention, in addition to the liquid component, in particular $H_2O$, a gaseous component $N_2$ is separated from the medium by the gas-liquid separator (2).

23 Claims, 3 Drawing Sheets

(51) Int. Cl.
*B01D 45/16* (2006.01)
*B01D 53/22* (2006.01)
*B01D 53/24* (2006.01)
*B01D 63/06* (2006.01)
*F16T 1/00* (2006.01)

(52) U.S. Cl.
CPC .............. *B01D 53/22* (2013.01); *B01D 53/24* (2013.01); *B01D 63/06* (2013.01); *F16T 1/00* (2013.01); *B01D 2053/223* (2013.01); *H01M 2250/20* (2013.01)

(56) References Cited

U.S. PATENT DOCUMENTS

2014/0377675 A1* 12/2014 Peterson ................ B01D 53/26
                                                              429/414
2015/0107198 A1    4/2015 Yamaura

FOREIGN PATENT DOCUMENTS

| | | |
|---|---|---|
| DE | 10120018 | 12/2001 |
| DE | 10245660 A1 | 8/2003 |
| DE | 102014220891 | 4/2015 |
| DE | 102014013372 A1 | 3/2016 |
| DE | 102016013666 A1 | 5/2018 |
| JP | S58186422 A | 10/1983 |
| JP | 2007042607 A | 2/2007 |
| JP | 2016072183 A | 5/2016 |
| KR | 1020090019980 A | 2/2009 |
| KR | 20140083817 | 7/2014 |
| WO | 2008052578 A1 | 5/2008 |

* cited by examiner

GAS-LIQUID SEPARATOR FOR SEPARATING AT LEAST ONE LIQUID COMPONENT FROM A GASEOUS COMPONENT

BACKGROUND OF THE INVENTION

The present invention relates to a gas-liquid separator for separating at least one liquid component from a gaseous component, to which separator a medium is supplied via an inlet, wherein a separation at least of the liquid component of the medium takes place in at least one container, in particular for use in a fuel cell system of vehicles with a fuel cell drive.

In the automotive sector, gaseous fuels will in future also play an increasing role alongside liquid fuels. In particular in vehicles with a fuel cell drive, hydrogen gas streams must be controlled. The gas streams are thereby no longer controlled discontinuously as in the case of the injection of liquid fuel, but instead the gas is removed from at least one high-pressure tank and conducted via an inflow line of a medium-pressure line system to an ejector unit. This ejector unit guides the gas via a connecting line of a low-pressure line system to a fuel cell. From the fuel cell, an exhaust gas, which consists in particular of unconsumed hydrogen and a non-active fraction, in particular hydrogen and nitrogen, is recirculated via a recirculation path.

From DE 10 2014 220 891 A1 there is known a gas-liquid separator for separating a liquid component, in particular water, from a gaseous component, in particular exhaust gas, which is given off by a fuel cell. This gas-liquid separator has a housing into which the exhaust gas is supplied via a delivery pipe. In the housing, water contained in the exhaust gas is separated from the exhaust gas. Thereafter, the exhaust gas, which contains substances such as hydrogen, wherein hydrogen will be referred to as $H_2$ hereinbelow, is carried back to the fuel cell via an outlet pipe. The housing further has a discharge connection via which separated and stored water is discharged from the housing to the outside.

The gas-liquid separator known from DE 10 2014 220 891 A1 can have some disadvantages.

Because the exhaust gas from the fuel cell, which is introduced into the housing via a delivery pipe, also contains further heavy components, in particular gaseous nitrogen, which is referred to as $N_2$ hereinbelow, in addition to the component water, gaseous nitrogen is conveyed with the hydrogen out of the housing again, for example via the outlet pipe, into the fuel cell again. The gas-liquid separator thus has the disadvantage that not only almost pure hydrogen but also other heavy components, such as, for example, $N_2$, are conveyed back into the fuel cell. The efficiency of the fuel cell, and thus of the fuel cell system, is thereby reduced. Alternatively, an additional component part would be necessary in the fuel cell system for discharging the component gaseous $N_2$, for example in the form of a discharge valve. However, such a discharge valve on the one hand has the disadvantage that a proportion of $H_2$ is also always separated when $N_2$ is discharged. On the other hand, an additional component part must be provided in the fuel cell system, in particular in the form of the discharge valve.

SUMMARY OF THE INVENTION

According to the invention, there is proposed a gas-liquid separator in which, in addition to the liquid component, in particular water, which is referred to as $H_2O$ hereinbelow, a gaseous component $N_2$ is separated from the medium. In this manner, the advantage can be achieved that multiple undesirable components of a medium, which are in particular waste substances of a recirculation medium from a fuel cell, are separated simultaneously by means of the gas-liquid separator. The proportion of a gaseous component of the medium, which is required for generating energy in the fuel cell, in particular on an anode side, is thereby increased. That component is in particular $H_2$, which, after it has flowed through the gas-liquid separator, is carried back into the fuel cell again. This offers the advantage that the efficiency of the fuel cell and/or of a fuel cell system is increased while the undesirable components, which are obtained as by-products and/or waste products during operation of the fuel cell, are separated by means of the gas-liquid separator and thus a high proportion of the component required for generating energy in the fuel cell can be conveyed back into the fuel cell. Furthermore, as a result of the configuration according to the invention, an additional component part in the fuel cell system for discharging the gaseous $N_2$, for example in the form of a discharge valve, is no longer required since that function is performed by the gas-liquid separator. In this manner, the advantage can be achieved that costs can be saved, since the additional component part, a discharge valve, is no longer required. Furthermore, the requirement for $H_2$ during operation of the fuel cell system can be reduced, which in turn leads to cost savings in terms of operating costs.

The dependent claims relate to preferred further developments of the invention.

According to a particularly advantageous embodiment, as a result of the configuration according to the invention of the gas-liquid separator, the components $H_2O$ and $N_2$ are separated from the medium, in particular from the component $H_2$ of the medium, by means of the centrifugal principle. In this manner, the advantage can be achieved that no additional energy and/or only a small amount of energy must be provided, in particular by the fuel system and/or by the superordinate system that is the vehicle, for separating the components $H_2O$ and $N_2$ from the component $H_2$. This is because the medium supplied via an inlet into the at least one container already has an inflow speed which is necessary for separating the components by means of the centrifugal principle and the medium does not have to be accelerated via an input of energy. A further introduction of energy, in particular of kinetic energy, into the medium is thus no longer necessary. As a result, the efficiency of the fuel system can be increased and the operating costs can be reduced.

According to an advantageous further development, the at least one container has a container wall, a separating wall, a separating edge, a stabilization chamber, a reservoir and an outlet channel, wherein the separating wall has a nozzle tip on the side facing the container wall and the container wall has a curved region. In this manner, the advantage can be achieved that almost complete separation of the components $H_2O$ and $N_2$ from the medium is possible and/or that at least a large proportion of the components $H_2O$ and $N_2$ is separated from the medium. It can thus be ensured that the medium that is guided via a first outlet out of the at least one container through an outflow line back into the fuel cell consists almost completely or at least for the most part of the component $H_2$. The efficiency of the fuel cell can thus be increased, because almost exclusively $H_2$ is required for energy generation, in particular in an anode region of the fuel cell. Furthermore, the efficiency of a recirculation pump and of an integrated jet pump, which are optionally located between the at least one container and the fuel cell and which ensure a continuous delivery rate to the fuel cell, can also be increased. This offers the advantage that the efficiency of the fuel cell system as a whole can be increased, so that the operating costs can be reduced.

According to an advantageous embodiment, the medium coming from the stabilization chamber, as it flows past the curved region and/or the nozzle tip in a flow direction V, experiences a deflection such that the components $H_2O$ and $N_2$, owing to their size, experience a less pronounced deflection and the light component $H_2$, owing to its size, experiences a greater deflection. In this manner, the advantage can be achieved that the components $H_2O$ and $N_2$ and $H_2$ are so accelerated and deflected by the acceleration as they flow past the nozzle tip that the heavy components $H_2O$ and $N_2$ can better be separated from the light component $H_2$, in particular by means of the centrifugal principle. As a result, the efficiency of the gas-liquid separator, and thus the efficiency of the fuel cell system as a whole, can be increased.

According to a particularly advantageous further development, the medium, after flowing past the curved region and/or the nozzle tip, meets the separating edge, wherein the light component $H_2$ is deflected in a flow direction VII to the outlet channel and the components $H_2O$ and $N_2$ are deflected in a flow direction VI to the reservoir. In this manner, the medium and the different components of the medium are slowed down to a lesser extent by the separating edge during the separating process, as compared with a more pronounced slowing down of the medium when a separating edge is not present. The separating edge thus assists with the process of separating the heavy components $H_2O$ and $N_2$ from the lighter component $H_2$ of the medium, in particular by means of the centrifugal principle. An efficient outflow of $H_2O$ and $N_2$, with a low flow loss, into the reservoir and of $H_2$ to the first outlet is thus made possible. Furthermore, the medium with the high $H_2$ content can move from there in the flow direction further through the outflow line without the need for further flow-assisting component parts such as pumps or fans in the region of the at least one container to make possible further transport of the medium with the high $H_2$ content. The energy for operating further flow-assisting components, in particular electrically driven pumps or fans, in the region of the at least one container or at the at least one container can thus be reduced. As a result, the efficiency of the fuel cell system can be increased and the operating costs can be reduced.

According to an advantageous further development, the gas-liquid separator has multiple containers, wherein a first container has the inlet, at least one pipe and the stabilization chamber and wherein the pipe is arranged inside the first container. Furthermore, a second container has the reservoir and a sensor system, and the pipe is thereby fluidically connected to the inlet of the first container and to the reservoir of the second container. Furthermore, the pipe forms a pipe wall, wherein the pipe wall is in the form of a membrane, in particular in the form of a semi-permeable membrane, wherein the membrane is permeable to the component $H_2$ of the medium and wherein the membrane is impermeable to the components $H_2O$ and $N_2$ of the medium, in particular owing to the molecule size of the respective component. In this manner, the advantage can be achieved that the separation process by the gas-liquid separator is so improved that the components $H_2O$ and $N_2$ are separated almost completely from the medium, in particular from the $H_2$. It can thereby be ensured that as high a proportion of $H_2$ as possible flows back to the fuel cell, in particular through the outflow line and the inflow line, whereby on the one hand the efficiency and/or the performance of the fuel cell can be increased.

According to an advantageous further development, the component $H_2$ of the medium moves out of the pipe, in particular through the pipe wall, into the stabilization chamber. During this movement, a movement of the components $H_2O$ and $N_2$ of the medium out of the pipe, in particular through the pipe wall, is prevented. In this manner, the advantage can be achieved that almost no $H_2O$ and $N_2$ or only a small proportion of $H_2O$ and $N_2$ is able to flow through the outflow line to the recirculation pump and/or to the integrated jet pump. As a result, it is possible to rule out or at least reduce the risk that component parts and/or movable component parts in the recirculation path that are susceptible to corrosion will be damaged by the components $H_2O$ and $N_2$. Furthermore, the risk is ruled out or at least reduced that electrical component parts of the recirculation pump and/or of the integrated jet pump will be damaged by the introduction of $H_2O$ and $N_2$, which occurs in particular in the form of damage by an electrical short circuit, whereby the fuel cell system as a whole could in turn be damaged. As a result, the service life of the recirculation pump and/or of the integrated jet pump and/or of the fuel cell system as a whole can be increased and the possibility of failure of the fuel cell system as a whole can be reduced.

According to an advantageous embodiment, there is a pressure difference between the inner region and the outer region of the pipe, whereby a movement of the component $H_2$ of the medium out of the pipe, in particular through the pipe wall, into the stabilization chamber is assisted. In this manner it is possible to avoid the need for additional energy for the gas-liquid separator for effecting a separation of $H_2$ from the components $H_2O$ and $N_2$, since the pressure difference is maintained by the medium flowing behind through the connecting line, as long as the fuel cell is in operation. As a result, the efficiency of the fuel cell system can be increased and the operating costs reduced.

According to a particularly advantageous further development, at least two pipes are combined to form a pipe bundle, wherein the pipes are each fluidically connected to the inlet of the first container and to the reservoir of the second container. In this manner, the advantage can be achieved that a larger surface area of the membrane can be provided, so that on the one hand a larger volume of the medium can be treated. Only a small additional installation space is thereby required, compared to the relatively large increase in surface area of the membrane. Furthermore, as a result of the increased surface area of the membrane, separation of the components of the medium can be achieved with a smaller pressure difference. As a result, the efficiency of the fuel cell system can be increased and the operating costs can be reduced. Furthermore, the gas-liquid separator can be produced in a compact and space-saving design.

BRIEF DESCRIPTION OF THE DRAWINGS

An exemplary embodiment of the invention is described in detail hereinbelow with reference to the accompanying drawing, in which.

DETAILED DESCRIPTION

Figure 1:
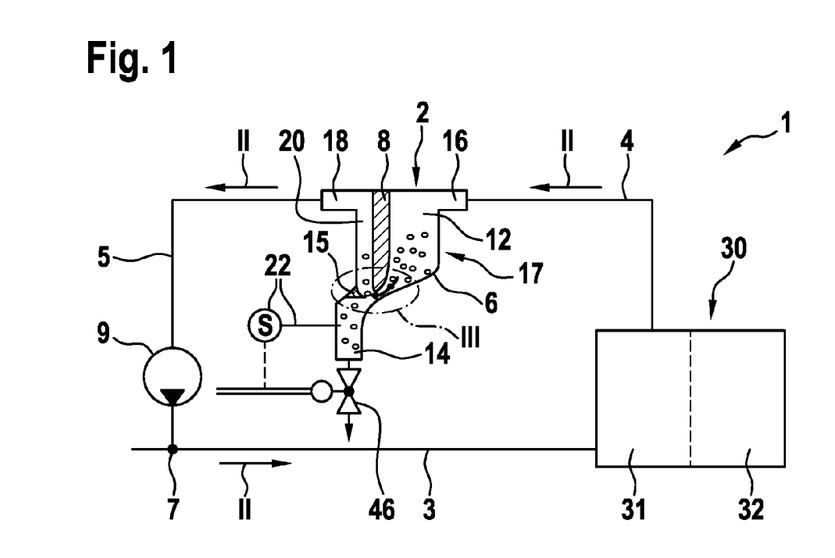
FIG. 1 is a schematic representation of a fuel cell system with a gas-liquid separator according to the invention according to a first exemplary embodiment.
Figure 2:
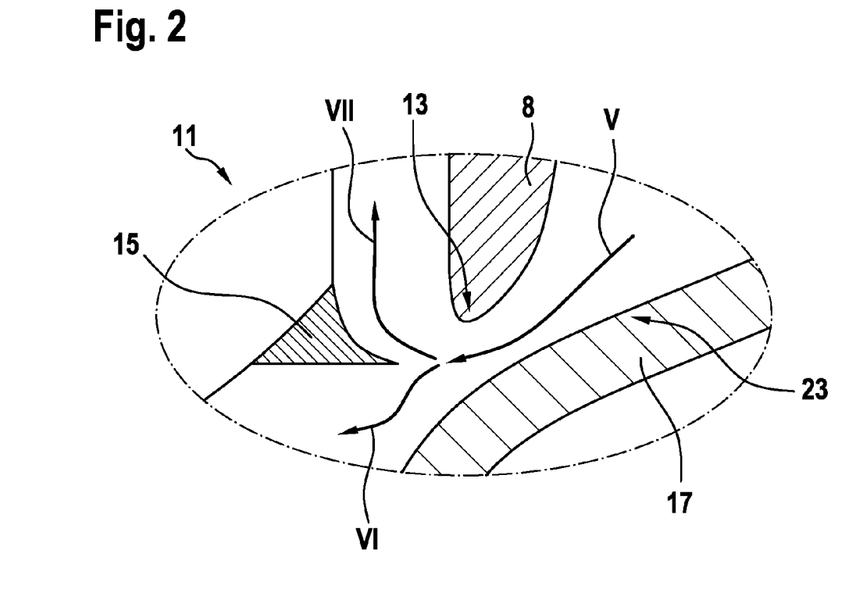
FIG. 2 is a sectional view of a nozzle designated III in FIG. 1 of the gas-liquid separator.

The representation according to FIG. 1 and FIG. 2 shows a fuel cell system 1 having a first exemplary embodiment of a gas-liquid separator 2 according to the invention, wherein the gas-liquid separator 2 separates a gaseous component $N_2$ from the medium in addition to the liquid component, in particular $H_2O$. The components $H_2O$ and $N_2$ are thereby separated from the medium, in particular from the component $H_2$ of the medium, by means of the gas-liquid separator 2 according to the invention by means of the centrifugal principle.

In FIG. 1, the fuel system 1 is shown, in which a fuel cell 30, the gas-liquid separator 2 and an optional recirculation pump 9 are fluidically connected to one another by means of lines. The fuel cell 30 has an anode region 31 and a cathode region 32 and serves in particular in a vehicle to generate energy by means of a reaction of hydrogen, that is to say $H_2$, and oxygen, that is to say $O_2$. The energy can thereby be generated in the form of electrical energy. The gas-liquid separator 2 according to the invention is fluidically connected to the anode region 31 via a connecting line 4. A medium, which in particular is a recirculation medium from the anode region 31 of the fuel cell 30, is thereby conducted for recirculation at the gas-liquid separator 2. The recirculation medium consists almost entirely of unconsumed $H_2$ that has not reacted chemically or electrically with oxygen in the fuel cell 30, as well as the waste products $H_2O$ and $N_2$ from the process of energy production in the fuel cell 30. The medium thereby flows in a flow direction II on the anode side through the connecting line 4 into an inlet 16 of the gas-liquid separator 2. Alternatively, the components $H_2O$ and $N_2$ can also be referred to as a non-active gas fraction, wherein the components cannot be used for energy production in the anode region 31 in the fuel cell 30. The efficiency of the overall operation of the fuel cell system 1 is thus reduced by the components $H_2O$ and $N_2$ in the recirculation path, since the components, if they are not separated by means of the gas-liquid separator 2, must also be conveyed through the entire anode path, in particular through the connecting line 4, an outflow line 5, the recirculation pump 9, an integrated jet pump 10 which is optionally present, and through an inflow line 3. Lower amounts and/or volumes of the component $H_2$ which is required for energy production in the fuel cell 30 can thus also be conveyed and/or recirculated.

In addition to the inlet 16, the gas-liquid separator 2 has at least one container 6 and a first outlet 18. The at least one container 6 has a container wall 17, a separating wall 8, a separating edge 15, a stabilization chamber 12, a reservoir 14 and an outlet channel 20, wherein the separating wall 8 has a nozzle tip 13 on the side facing the container wall 17 and the container wall 17 has a curved region 23. In the at least one container 6, the medium coming from the stabilization chamber 12, as it flows past the curved region 23 and/or the nozzle tip 13 in a flow direction V, experiences a deflection such that the components $H_2O$ and $N_2$, owing to their size, experience a less pronounced deflection and the light component $H_2$, owing to its size, experiences a greater deflection. As a result, the components $H_2O$ and $N_2$ of the medium are conducted into the reservoir 14 while the component $H_2$ of the medium is conducted into the region of the outlet channel 20 in the at least one container 6.

It is further shown in FIG. 1 that the at least one container 6 has a sensor system 22 which measures a concentration of the components $H_2O$ and $N_2$ and/or a pressure in the region of the reservoir 14 and is connected at least indirectly to a discharge valve 46. As soon as the sensor system 22 detects a specific value in respect of the concentration of the components $H_2O$ and $N_2$ and/or a pressure, the discharge valve 46 is triggered and the components $H_2O$ and $N_2$ are discharged and/or conducted out of the at least one container 6, in particular out of the region of the reservoir 14, by means of the discharge valve 46. Alternatively, the sensor system 22 responds at a defined proportion of $H_2O$ and $N_2$ and opens the discharge valve 46. According to an exemplary embodiment of the gas-liquid separator 2, the discharge valve 46 can be arranged at the deepest point of the at least one container 6 in order to ensure almost complete emptying of the reservoir 14 by means of and/or assisted by gravity.

The $H_2$ in the region of the outlet channel 20 and separated from the components $H_2O$ and $N_2$, in particular separated by means of the curved region 23 and the nozzle tip 13, flows, after it has entered the outlet channel 20, further to the first outlet 18 of the at least one container 6 and, from there, in the flow direction II, via the outflow line 5, further to a recirculation pump 9, which can be provided as an optional component in the fuel cell system 1. The recirculation pump 9 serves to convey and/or compress the medium, in particular $H_2$. The recirculation pump 9 is thereby to ensure a continuous feed stream of the medium into the fuel cell 30, in particular at operating points and/or under operating states of the fuel cell system 31 at which the feed stream of the medium could come to a standstill. After the medium has passed through the recirculation pump 9, it reaches a junction 7, wherein the junction can be in the form of the integrated jet pump 10 (shown in FIG. 3), wherein the medium flows from the junction 7 in the flow direction II and through the inflow line 3 to the fuel cell 30 and wherein the medium in particular flows from the inflow line 3 into the anode region 31 of the fuel cell 30.

FIG. 2 shows a detail III of a nozzle 11, shown in FIG. 1, of the gas-liquid separator 2. After the medium has flowed past the curved region 23 and/or the nozzle tip 13 of the separating wall 8, it meets the separating edge 15 in the flow direction V, wherein the light component $H_2$ is deflected in a flow direction VII to the outlet channel 20 and the components $H_2O$ and $N_2$ are deflected in a flow direction VI to the reservoir 14. The curved region 23 is part of the container wall 17. Furthermore, the separating edge 15 has a pointed or wedge-shaped region which assists with the separation of the components $H_2O$ and $N_2$ from the component $H_2$, in particular by means of the centrifugal principle. The separation of the components $H_2O$ and $N_2$ from the remainder of the medium, in particular from the $H_2$, takes place on the basis of the different masses of the components, wherein the components $H_2O$ and $N_2$ are heavier than the lighter component $H_2$. As the components flow along the curved region 23 and pass the nozzle tip 13, a centrifugal force acts on the components, which in turn facilitates the separation of the components $H_2O$ and $N_2$ from the lighter component $H_2$, in particular by means of the centrifugal principle.

It is additionally advantageous thereby that the flow channel tapers in the flow direction V between the separating wall 8 and the container wall 17, in particular between the nozzle tip 13 and the curved region 23, and/or the distance between the separating wall 8 and the container wall 17 becomes smaller in the flow direction V. As a result, the flow speed of the medium, which at this point in time still contains all the components $H_2O$, $N_2$ and $H_2$, can be increased, whereby the centrifugal force can be increased and the separation can thus be facilitated. The arrangement of the separating edge 15 further has an advantageous effect on the separation process, which arrangement facilitates a division of the medium from a flow direction V into on the one hand a flow direction VI in the direction towards the reservoir 14 for the heavy components $H_2O$ and $N_2$ and on the other hand a flow direction VII in the direction towards the outlet channel 20 for the light component $H_2$. Furthermore, it is additionally advantageous if the gas-liquid separator 2 and/or the at least one container 6 and/or the nozzle 11 are so oriented that the flow direction V of the medium and/or the flow direction VI of the components $H_2O$ and $N_2$ extend at least approximately in the effective direction of gravity. The flow direction VII of the component $H_2$ thereby extends, in particular after it has flowed past the separating edge 15, at least approximately contrary to the effective direction of gravity. As a result, the separation of the heavier components and of the lighter components by means of the centrifugal principle can additionally be assisted by the effect of gravity, and more efficient separation can thus be achieved.

Figure 3:
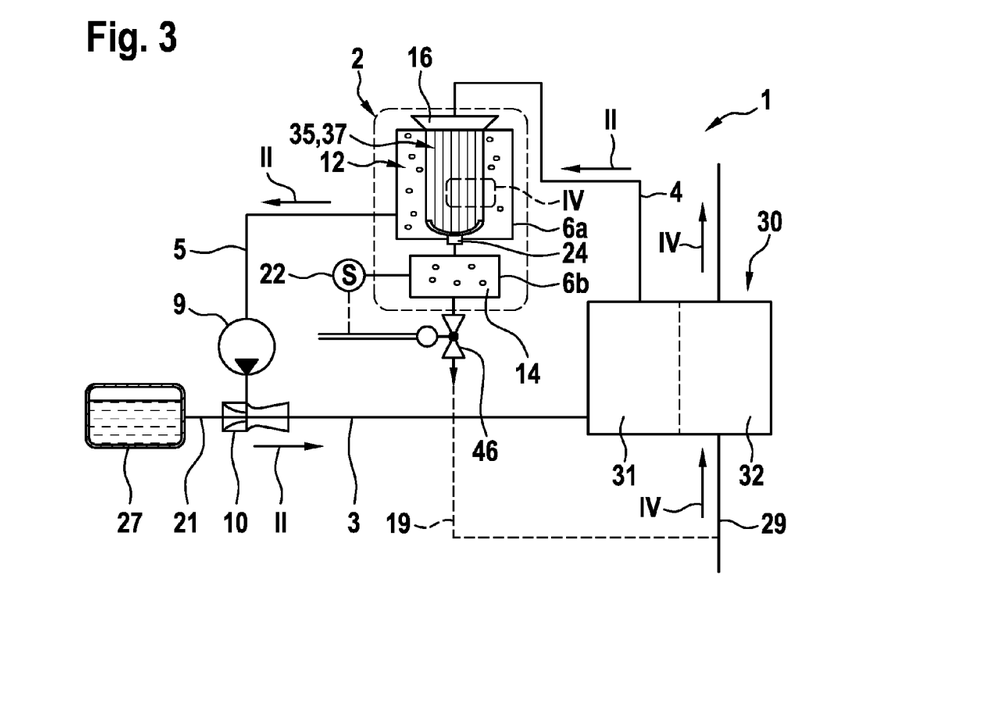
FIG. 3 is a schematic representation of the fuel cell system with the gas-liquid separator according to the invention according to a second exemplary embodiment.

FIG. 3 shows a schematic representation of the fuel cell system 1 with the gas-liquid separator 2 according to the invention according to a second exemplary embodiment. In that figure it is shown that the fuel cell 30 has the anode region 31 and the cathode region 32. Air, in particular $O_2$, is supplied to the cathode region 32 by means of an intake tract 29 in a flow direction IV on the cathode side. In FIG. 3 it is shown that the medium, which in particular is a recirculation medium from the anode region 31 of the fuel cell 30, is conducted from the anode region 31 in the flow direction II via the connecting line 4 to the gas-liquid separator 2. The gas-liquid separator 2 has multiple containers 6a, b, wherein a first container 6a has the inlet 16, at least one pipe 35 and the stabilization chamber 12, wherein the pipe 35 is arranged inside the first container 6a, wherein a second container 6b has the reservoir 14 and the sensor system 22 and wherein the pipe 35 is fluidically connected to the inlet 16 of the first container 6a and to the reservoir 14 of the second container 6b. In a further exemplary embodiment of the gas-liquid separator 2, at least two pipes 35 can be combined to form a pipe bundle 37, wherein the pipes 35 are each fluidically connected to the inlet 16 of the first container 6a and to the reservoir 14 of the second container 6b. Furthermore, the sensor system 22 continuously measures the proportion of $H_2O$ and $N_2$ in the second container 6b and, as soon as a specific value in respect of the concentration of the components $H_2O$ and $N_2$ and/or a pressure is exceeded, the discharge valve 46 is triggered and the components $H_2O$ and $N_2$ are discharged and/or conducted out of the second container 6b, in particular from the region of the reservoir 14, by means of the discharge valve 46. After the components $H_2O$ and $N_2$ have been conducted out of the second container 6b by means of the discharge valve 46, they pass via a return line 19 into an intake tract 29 of the fuel cell system 1. From there, the components $H_2O$ and $N_2$ flow in a flow direction IV through the intake tract 29 further into the cathode region 32.

In FIG. 3 it is shown that the medium coming from the anode region 31 of the fuel cell 30 flows via the inlet 16 into the first container 6a, wherein the medium flows in at least one pipe 35 or into a pipe bundle 37 of the gas-liquid separator 2. Separation of the components $H_2O$ and $N_2$ from the remainder of the medium, in particular from the $H_2$, then takes place via the pipe 35 or the pipe bundle 37. This is made possible by a permeability of a pipe wall 36 of the pipe 35 or of the pipe bundle 37, wherein the component $H_2$, in particular owing to its smaller molecule size as compared with the components $H_2O$ and $N_2$, is able to diffuse through the pipe wall 36 into the stabilization chamber 12. The components $H_2O$ and $N_2$, in particular owing to their larger molecule size as compared with the component $H_2$, cannot diffuse through the pipe wall 36 and are therefore conducted through the entire length of the pipe 35 or of the pipe bundle 37 via a second outlet 24 into the second container 6b, where they are collected. In a possible embodiment of the gas-liquid separator 2, the second outlet 24 is in such a form that a backflow of the components $H_2O$ and $N_2$ from the second container 6b via the second outlet 24 into the pipe 35 or the pipe bundle 37 is prevented.

The medium collected in the stabilization chamber 12, in particular the component $H_2$, finally flows in the flow direction II through the outflow line 6 to the recirculation pump 9, wherein the compression and acceleration process to which the medium is subjected by the recirculation pump 9 is explained in greater detail in the description of FIG. 1. From the recirculation pump 9, the medium, which in particular is almost entirely $H_2$, flows further into the integrated jet pump 10. A so-called jet pump effect takes place inside the jet pump 10. For this purpose, a gaseous driving medium, in particular $H_2$, flows from a tank 27, in particular a high-pressure tank 27, into the jet pump 10 through a tank line 21 from outside the jet pump 10. Furthermore, the recirculation medium is conveyed by the recirculation pump 9 into an intake region of the jet pump 10. The driving medium is then introduced into the intake region under high pressure. The gaseous driving medium thereby flows in the direction of the flow direction II. The $H_2$ flowing from the high-pressure tank 27 into the intake region of the jet pump 10 and serving as the driving medium has a pressure difference with respect to the recirculation medium which flows into the intake region, wherein the driving medium in particular has a higher pressure of at least 10 bar. In order that the jet pump effect is established, the recirculation medium is conveyed into the intake region of the jet pump 10 at a low pressure and a low mass flow rate. The driving medium thereby flows with the described pressure difference and a high speed, which in particular is close to the speed of sound, into the intake region. The driving medium thereby meets the recirculation medium, which is already in the intake region. Owing to the high speed and/or pressure difference between the driving medium and the recirculation medium, internal friction and turbulence is generated between the media. A shear stress is thereby generated in the boundary layer between the fast driving medium and the substantially slower recirculation medium. This stress causes a transfer of momentum, whereby the recirculation medium is accelerated and carried along. Mixing occurs by the principle of conservation of momentum. The recirculation medium is thereby accelerated in the flow direction II, and a pressure drop is also produced for the recirculation medium, whereby a suction effect occurs and thus further recirculation medium is conveyed out of the region of the recirculation pump 9.

After the recirculation medium has been accelerated in the jet pump 10 by the driving medium and the two media have mixed, the mixed medium flows through the inflow line 3 to the fuel cell 30, in particular to the anode region 31.

Figure 4:
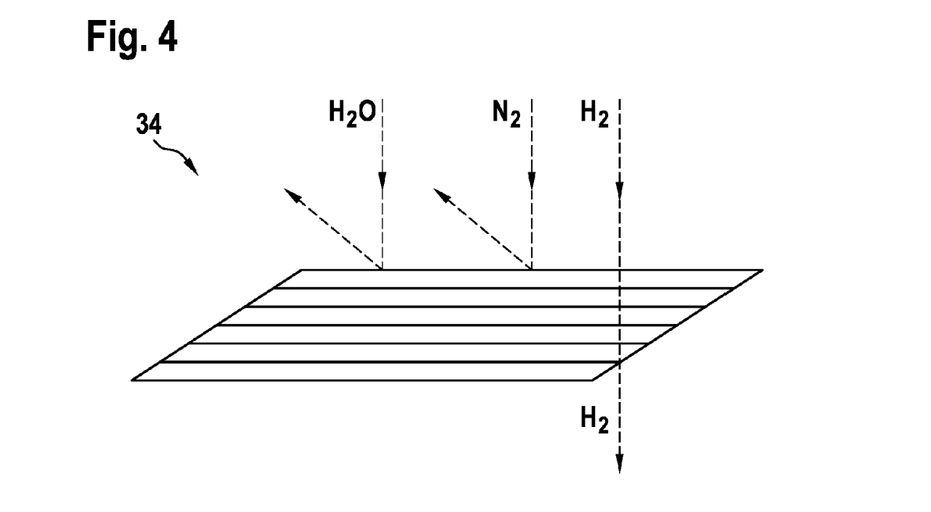
FIG. 4 is a perspective sectional view of a membrane of the gas-liquid separator.

FIG. 4 shows a membrane 34 of the pipe wall 36, wherein the membrane 34 is shown as a perspective sectional view. The membrane 34 is in the form of a semi-permeable membrane 34, wherein the membrane 34, as shown in FIG. 4, is permeable to the component $H_2$ of the medium and wherein the membrane 34 is impermeable to the components $H_2O$ and $N_2$ of the medium, in particular owing to the molecule size of the respective component. The components $H_2O$ and $N_2$ are too large to diffuse through the structure, in particular the lattice structure, of the membrane 34, while the component $H_2$ of the medium is sufficiently small to diffuse through the structure of the membrane 34.

Figure 5:
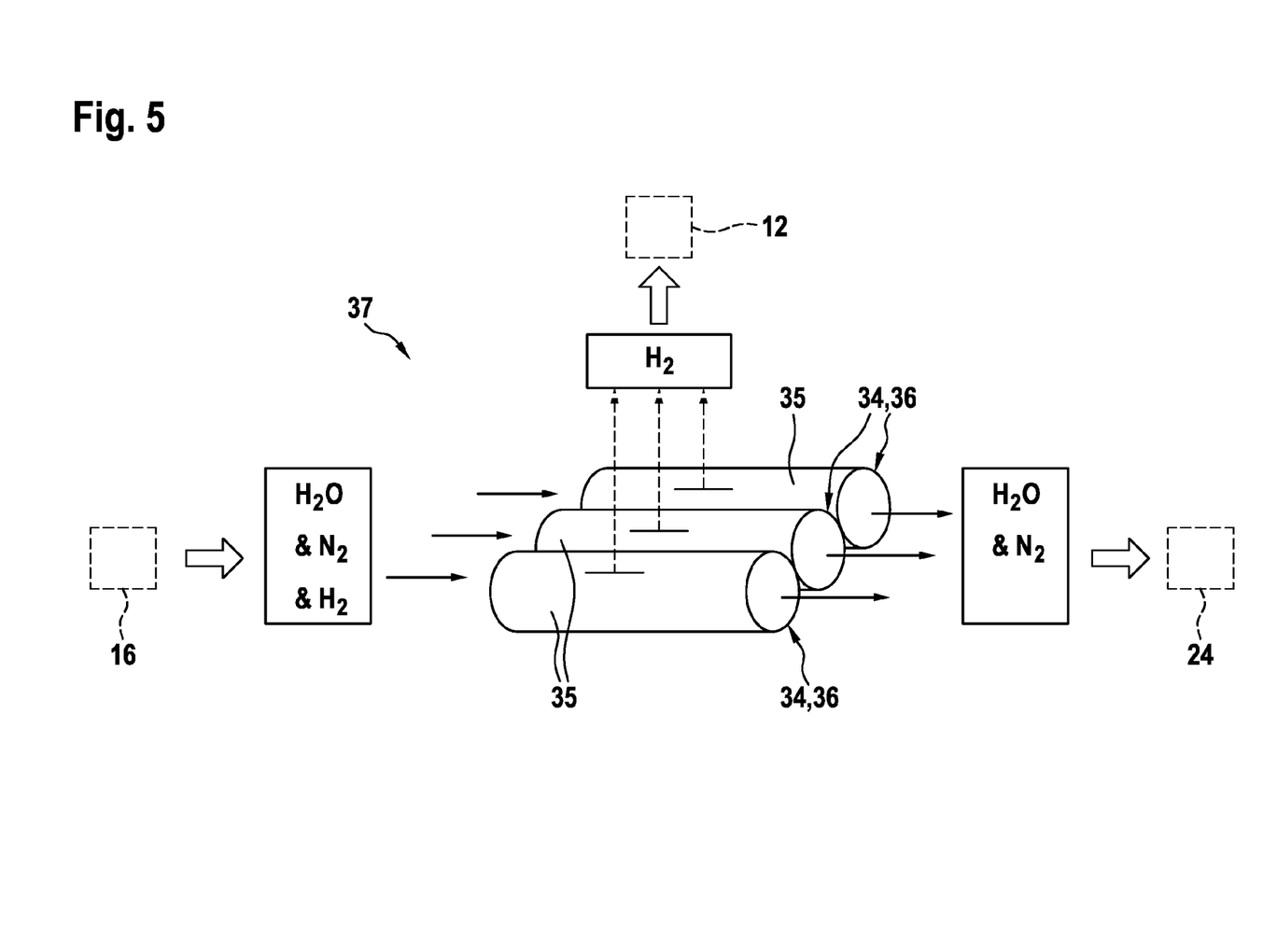
FIG. 5 is a perspective sectional view of a pipe bundle designated IV in FIG. 3 of the gas-liquid separator.

FIG. 5 shows that the pipe 35 forms the pipe wall 36, wherein the pipe wall 36 is in the form of a membrane 34, wherein the membrane 34 is permeable to the component $H_2$ of the medium and wherein the membrane 34 is impermeable to the components $H_2O$ and $N_2$ of the medium, in particular owing to the molecule size of the respective component. In FIG. 5 it is shown that multiple pipes 35 can be combined to form a pipe bundle 37, wherein the pipes 35 in one possible embodiment of the gas-liquid separator 2 run parallel to one another. It is shown that a movement of component $H_2$ of the medium out of the respective pipe 35, in particular through the pipe wall 36, into the stabilization chamber 12 takes place, while a movement of the components $H_2O$ and $N_2$ of the medium out of the pipe 35, in particular through the pipe wall 36, is prevented. The components $H_2O$ and $N_2$ are therefore able to flow further only in the direction towards the second outlet 24, wherein the components $H_2O$ and $N_2$ flow further through the second outlet 24 into the second container 6b (shown in FIG. 3). In an advantageous embodiment of the gas-liquid separator 2, there is a pressure difference between the inner region and the outer region of the pipe 35 or of the pipe bundle 37, whereby a movement of the component $H_2$ of the medium out of the pipe 35 or the pipe bundle 37, in particular through the pipe wall 36, into the stabilization chamber 12 is assisted.

The invention is not limited to the exemplary embodiments described herein and the aspects given emphasis therein. Rather, a large number of modifications, within the scope defined by the claims, are possible.

What is claimed is:

1. A gas-liquid separator (2) for separating at least one liquid component from a gaseous component, the gas-liquid separator having at least one container (6) to which a medium is conveyed via an inlet (16), wherein a separation at least of the liquid component of the medium takes place in the at least one container (6), wherein the separated component of the medium is discharged from the at least one container (6) via a discharge valve (46) and the remaining gaseous component of the medium is guided back into an outflow line (5) via a first outlet (18), characterized in that, in addition to the liquid component, a gaseous component $N_2$ is separated from the medium by the gas-liquid separator (2), characterized in that the at least one container (6) has a container wall (17), a separating wall (8), a separating edge (15), a stabilization chamber (12), a reservoir (14) and an outlet channel (20), wherein the separating wall (8) has a nozzle tip (13) on the side facing the container wall (17), and the container wall (17) has a curved region (23).

2. The gas-liquid separator (2) as claimed in claim 1, wherein the liquid component is $H_2O$ and the gaseous component is $H_2$, and wherein the components $H_2O$ and $N_2$ are separated from the component $H_2$ of the medium, by the centrifugal principle.

3. The gas-liquid separator (2) as claimed in claim 2, characterized in that the medium coming from the stabilization chamber (12), as the medium flows past the curved region (23) and/or the nozzle tip (13) in a flow direction V, experiences a deflection such that the components $H_2O$ and $N_2$, owing to their size, experience a less pronounced deflection and the light component $H_2$, owing to its size, experiences a greater deflection.

4. The gas-liquid separator (2) as claimed in claim 3, characterized in that the medium, after flowing past the curved region (23) and/or the nozzle tip (13), meets the separating edge (15), wherein the light component $H_2$ is deflected in a flow direction VII to the outlet channel (20) and the components $H_2O$ and $N_2$ are deflected in a flow direction VI to the reservoir (14).

5. A gas-liquid separator (2) for separating at least one liquid component from a gaseous component, the gas-liquid separator having at least one container (6) to which a medium is conveyed via an inlet (16), wherein a separation at least of the liquid component of the medium takes place in the at least one container (6), wherein the separated component of the medium is discharged from the at least one container (6) via a discharge valve (46) and the remaining gaseous component of the medium is guided back into an outflow line (5) via a first outlet (18), characterized in that, in addition to the liquid component, a gaseous component $N_2$ is separated from the medium by the gas-liquid separator (2), wherein the gas-liquid separator has multiple containers (6a, b), wherein a first container (6a) has the inlet (16), at least one pipe (35) and a stabilization chamber (12), wherein the pipe (35) is arranged inside the first container (6a), wherein a second container (6b) has a reservoir (14) and a sensor system (22), and wherein the pipe (35) is fluidically connected to the inlet (16) of the first container (6a) and to the reservoir (14) of the second container (6b), wherein the liquid component is $H_2O$ and the gaseous component is $H_2$, wherein the pipe (35) forms a pipe wall (36), wherein the pipe wall (36) is in the form of a membrane (34), wherein the membrane (34) is permeable to the component $H_2$ of the medium and wherein the membrane (34) is impermeable to the components $H_2O$ and $N_2$ of the medium.

6. The gas-liquid separator (2) as claimed in claim 5, characterized in that a movement of component $H_2$ of the medium out of the pipe (35) into the stabilization chamber (12) takes place, while a movement of the components $H_2O$ and $N_2$ of the medium out of the pipe (35) is prevented.

7. The gas-liquid separator (2) as claimed in claim 6, characterized in that there is a pressure difference between the inner region and the outer region of the pipe (35), whereby a movement of the component $H_2$ of the medium out of the pipe (35) into the stabilization chamber (12) is assisted.

8. The gas-liquid separator (2) as claimed in claim 6, characterized in that at least two pipes (35) are combined to form a pipe bundle (37), wherein the pipes (35) are each fluidically connected to the inlet (16) of the first container (6a) and to the reservoir (14) of the second container (6b).

9. A fuel cell arrangement comprising a gas-liquid separator (2) as claimed in claim 1, for controlling a hydrogen supply to and/or hydrogen discharge from a fuel cell (30).

10. The gas-liquid separator (2) as claimed in claim 1, wherein the liquid component is $H_2O$ and the gaseous component is $H_2$.

11. The gas-liquid separator (2) as claimed in claim 5, wherein the liquid component is $H_2O$ and the gaseous component is $H_2$, wherein the pipe (35) forms a pipe wall (36), wherein the pipe wall (36) is in the form of a semipermeable membrane (34), wherein the membrane (34) is permeable to the component $H_2$ of the medium and wherein the membrane (34) is impermeable to the components $H_2O$ and $N_2$ of the medium owing to the molecule size of the respective component.

12. The gas-liquid separator (2) as claimed in claim 11, characterized in that a movement of component $H_2$ of the medium out of the pipe (35) through the pipe wall (36) and into the stabilization chamber (12) takes place, while a movement of the components $H_2O$ and $N_2$ of the medium out of the pipe (35) through the pipe wall (36) is prevented.

13. The gas-liquid separator (2) as claimed in claim 12, characterized in that there is a pressure difference between the inner region and the outer region of the pipe (35), whereby a movement of the component $H_2$ of the medium out of the pipe (35) through the pipe wall (36) and into the stabilization chamber (12) is assisted.

14. A gas-liquid separator (2) for separating at least one liquid component from a gaseous component, the gas-liquid separator comprising at least one container (6), an inlet (16) for conveying a medium to the container, means for separating into a separated component at least the liquid component of the medium in the container (6), means for discharging the separated component of the medium from the at least one container (6) via a discharge valve (46), means for guiding a remaining gaseous component of the medium back into an outflow line (5) via a first outlet (18), and means for separating, in addition to the liquid component, a gaseous component $N_2$ from the medium, characterized in that the at least one container (6) has a container wall (17), a separating wall (8), a separating edge (15), a stabilization chamber (12), a reservoir (14) and an outlet channel (20), wherein the separating wall (8) has a nozzle tip (13) on the side facing the container wall (17), and the container wall (17) has a curved region (23).

15. A method for operating the gas-liquid separator (2) as claimed in claim 14, the method comprising
conveying the medium to the container (6),
separating into the separated component at least the liquid component of the medium in the container (6),
discharging the separated component of the medium from the container (6),
guiding the remaining gaseous component of the medium back into the outflow line (5), and
separating, in addition to the liquid component, the gaseous component $N_2$ from the medium.

16. The gas-liquid separator (2) as claimed in claim 14, wherein the liquid component is $H_2O$ and the gaseous component is $H_2$, and wherein the components $H_2O$ and $N_2$ are separated from the component $H_2$ of the medium, by the centrifugal principle.

17. The gas-liquid separator (2) as claimed in claim 16, characterized in that the medium coming from the stabilization chamber (12), as the medium flows past the curved region (23) and/or the nozzle tip (13) in a flow direction V, experiences a deflection such that the components $H_2O$ and $N_2$, owing to their size, experience a less pronounced deflection and the light component $H_2$, owing to its size, experiences a greater deflection.

18. The gas-liquid separator (2) as claimed in claim 17, characterized in that the medium, after flowing past the curved region (23) and/or the nozzle tip (13), meets the separating edge (15), wherein the light component $H_2$ is deflected in a flow direction VII to the outlet channel (20) and the components $H_2O$ and $N_2$ are deflected in a flow direction VI to the reservoir (14).

19. A gas-liquid separator (2) for separating at least one liquid component from a gaseous component, the gas-liquid separator comprising at least one container (6), an inlet (16) for conveying a medium to the container, means for separating into a separated component at least the liquid component of the medium in the container (6), means for discharging the separated component of the medium from the at least one container (6) via a discharge valve (46), means for guiding a remaining gaseous component of the medium back into an outflow line (5) via a first outlet (18), and means for separating, in addition to the liquid component, a gaseous component $N_2$ from the medium, wherein the gas-liquid separator has multiple containers (6a, b), wherein a first container (6a) has the inlet (16), at least one pipe (35) and a stabilization chamber (12), wherein the pipe (35) is arranged inside the first container (6a), wherein a second container (6b) has a reservoir (14) and a sensor system (22), and wherein the pipe (35) is fluidically connected to the inlet (16) of the first container (6a) and to the reservoir (14) of the second container (6b), wherein the liquid component is $H_2O$ and the gaseous component is $H_2$, wherein the pipe (35) forms a pipe wall (36), wherein the pipe wall (36) is in the form of a membrane (34), wherein the membrane (34) is permeable to the component $H_2$ of the medium and wherein the membrane (34) is impermeable to the components $H_2O$ and $N_2$ of the medium.

20. The gas-liquid separator (2) as claimed in claim 19, characterized in that a movement of component $H_2$ of the medium out of the pipe (35) into the stabilization chamber (12) takes place, while a movement of the components $H_2O$ and $N_2$ of the medium out of the pipe (35) is prevented.

21. The gas-liquid separator (2) as claimed in claim 20, characterized in that there is a pressure difference between the inner region and the outer region of the pipe (35), whereby a movement of the component $H_2$ of the medium out of the pipe (35) into the stabilization chamber (12) is assisted.

22. The gas-liquid separator (2) as claimed in claim 20, characterized in that at least two pipes (35) are combined to form a pipe bundle (37), wherein the pipes (35) are each fluidically connected to the inlet (16) of the first container (6a) and to the reservoir (14) of the second container (6b).

23. A fuel cell arrangement comprising a gas-liquid separator (2) as claimed in claim 5, for controlling a hydrogen supply to and/or hydrogen discharge from a fuel cell (30).

* * * * *